United States Patent
Hsu et al.

(10) Patent No.: US 10,972,455 B2
(45) Date of Patent: Apr. 6, 2021

(54) SECURE AUTHENTICATION IN TLS SESSIONS

(71) Applicant: INTERNATIONAL BUSINESS MACHINES CORPORATION, Armonk, NY (US)

(72) Inventors: Sheng-Tung Hsu, Taipei (TW); Wei-Hsiang Hsiung, Taipei (TW); Kuo-Chun Chen, New Taipei (TW); Wayne Chou, Yilan (TW)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 15/960,757

(22) Filed: Apr. 24, 2018

(65) Prior Publication Data
US 2019/0327222 A1    Oct. 24, 2019

(51) Int. Cl.
*H04L 29/06*    (2006.01)

(52) U.S. Cl.
CPC .......... *H04L 63/083* (2013.01); *H04L 63/166* (2013.01)

(58) Field of Classification Search
CPC . H04L 63/083; H04L 63/166; H04L 63/0869; H04L 9/3273; G06F 21/44
See application file for complete search history.

(56) References Cited

U.S. PATENT DOCUMENTS

| | | | |
|---|---|---|---|
| 8,190,876 B2 | 5/2012 | Schneider | |
| 8,752,162 B2 | 6/2014 | Kuehr-McLaren et al. | |
| 8,843,738 B2 | 9/2014 | Vos | |
| 8,856,869 B1 * | 10/2014 | Brinskelle | G06F 21/6218 726/2 |
| 9,021,583 B2 | 4/2015 | Wittenstein et al. | |
| 9,571,480 B1 * | 2/2017 | Asveren | H04L 63/10 |
| 9,654,466 B1 * | 5/2017 | Wu | H04L 63/12 |
| 9,680,869 B2 | 6/2017 | Buruganahalli et al. | |

(Continued)

FOREIGN PATENT DOCUMENTS

GB    2408659 A  *  6/2005  ..........  H04L 9/3236

OTHER PUBLICATIONS

PHP Security, "Insufficient Transport Layer Security (HTTPS, TLS and SSL)," http://phpsecurity.readthedoc.sio/en/latest/Transport-Layer-Security-(HTTPS-SSL-and-TLS).html, Copyright 2017, Padraic Brady, Printed on Apr. 17, 2018, pp. 1-10.

(Continued)

*Primary Examiner* — Oleg Korsak
*Assistant Examiner* — Nhan Huu Nguyen
(74) *Attorney, Agent, or Firm* — Anthony M. Pallone (57) ABSTRACT

An embodiment of the invention may include a method, computer program product and system for secure authentication within a communication protocol session. The embodiment may include retrieving, by a client computer of the TLS session, a challenge string associated with the TLS session. The embodiment may include generating, by the client computer, a first digest based on the challenge string and authentication information of a user of the client computer. The embodiment may include sending, by the client computer, the first digest to a server of the TLS session. The retrieving, generating and sending, by the client computer, are carried out after the TLS session has been established between the client computer and the server.

20 Claims, 5 Drawing Sheets

(56) References Cited

U.S. PATENT DOCUMENTS

| | | | |
|---|---|---|---|
| 9,692,757 B1* | 6/2017 | Mikulski | H04L 9/3242 |
| 10,075,437 B1* | 9/2018 | Costigan | G06F 21/316 |
| 10,129,223 B1* | 11/2018 | Bhattacharyya | H04L 63/061 |
| 2003/0200431 A1* | 10/2003 | Stirbu | H04L 63/166 |
| | | | 713/168 |
| 2003/0226017 A1* | 12/2003 | Palekar | H04L 63/0428 |
| | | | 713/168 |
| 2005/0097362 A1* | 5/2005 | Winget | H04L 63/0442 |
| | | | 726/4 |
| 2005/0120224 A1* | 6/2005 | Murakami | H04L 63/08 |
| | | | 713/182 |
| 2005/0268096 A1* | 12/2005 | Kilian-Kehr | H04L 63/0869 |
| | | | 713/168 |
| 2006/0041938 A1* | 2/2006 | Ali | H04L 63/166 |
| | | | 726/14 |
| 2006/0155995 A1* | 7/2006 | Torvinen | H04L 65/1016 |
| | | | 713/169 |
| 2007/0101159 A1* | 5/2007 | Zhang | H04L 51/00 |
| | | | 713/193 |
| 2007/0245148 A1* | 10/2007 | Buer | H04L 63/126 |
| | | | 713/182 |
| 2008/0077979 A1* | 3/2008 | Jeffries | H04L 9/3242 |
| | | | 726/6 |
| 2009/0025078 A1* | 1/2009 | Kuehr-McLaren | |
| | | | H04L 63/166 |
| | | | 726/14 |
| 2009/0086973 A1* | 4/2009 | Buddhikot | H04W 12/0609 |
| | | | 380/273 |
| 2009/0144436 A1* | 6/2009 | Schneider | H04L 63/0823 |
| | | | 709/229 |
| 2009/0158032 A1* | 6/2009 | Costa | H04L 63/10 |
| | | | 713/156 |
| 2010/0217975 A1* | 8/2010 | Grajek | G06F 21/445 |
| | | | 713/157 |
| 2010/0257359 A1 | 10/2010 | Currie | |
| 2011/0010544 A1* | 1/2011 | Inaba | H04L 9/321 |
| | | | 713/168 |
| 2011/0145575 A1* | 6/2011 | Blommaert | H04W 12/0609 |
| | | | 713/168 |
| 2011/0252227 A1* | 10/2011 | Strong | H04L 63/0823 |
| | | | 713/151 |
| 2012/0016977 A1 | 1/2012 | Robertson et al. | |
| 2012/0042160 A1* | 2/2012 | Nakhjiri | H04L 9/3271 |
| | | | 713/151 |
| 2013/0080769 A1* | 3/2013 | Cha | H04L 63/168 |
| | | | 713/155 |
| 2013/0305036 A1* | 11/2013 | Vos | H04L 63/08 |
| | | | 713/151 |
| 2013/0305048 A1* | 11/2013 | Yao | H04L 9/3073 |
| | | | 713/168 |
| 2014/0189808 A1* | 7/2014 | Mahaffey | H04L 63/083 |
| | | | 726/4 |
| 2014/0282978 A1* | 9/2014 | Lerner | H04L 63/083 |
| | | | 726/7 |
| 2014/0298415 A1* | 10/2014 | Xie | H04L 61/2589 |
| | | | 726/3 |
| 2014/0304498 A1* | 10/2014 | Gonuguntla | H04L 63/168 |
| | | | 713/151 |
| 2014/0331287 A1* | 11/2014 | Barr | H04L 63/08 |
| | | | 726/4 |
| 2014/0359700 A1* | 12/2014 | Krieger | H04L 63/166 |
| | | | 726/3 |
| 2016/0036794 A1* | 2/2016 | Adhya | H04W 12/06 |
| | | | 726/4 |
| 2016/0094531 A1* | 3/2016 | Unnikrishnan | G06F 21/31 |
| | | | 726/7 |
| 2016/0226835 A1* | 8/2016 | Hamburger | H04L 51/36 |
| 2018/0067671 A1* | 3/2018 | Marripudi | H04L 63/0823 |

OTHER PUBLICATIONS

Microsoft, "Challenge-Handshake Authentication Protocol (CHAP) (Windows CE 5.0)," Microsoft Developer Network, https://docs.microsoft.com/en-us/previous-versions/windows/embedded/ms880985(v=msdn.10), Printed on Apr. 17, 2018, Copyright 2006 Microsoft Corporation, pp. 1-1.

Apple, "Transmitting Data Securely," Apple Developer, https://developer.apple.com/library/content/documentation/Security/Conceptual/cryptoservices/, Printed on Oct. 23, 2017, Copyright 2014 Apple Inc., pp. 1-4.

Oppliger et al., "SSL/TLS session-aware user authentication—Or how to effectively thwart the man-in-the-middle," Science Direct, Computer Communications, Abstract, vol. 29, Issue 12, Aug. 4, 2006, pp. 1-3.

Das et al., "On the security of SSL/TLS-enabled applications," Science Direct, Applied Computing and Informatics, vol. 10, Issues 1-2, Jan. 2014, pp. 1-13.

Wikipedia, "Challenge-Handshake Authentication Protocol," https://en.wikipedia.org/wiki/Challenge-Handshake_Authentication_Protocol, Printed on Apr. 16, 2018, pp. 1-3.

Mell et al., "The NIST Definition of Cloud Computing," National Institute of Standards and Technology, U.S. Department of Commerce, Special Publication 800-145, Sep. 2011, pp. 1-7.

\* cited by examiner

SECURE AUTHENTICATION IN TLS SESSIONS

BACKGROUND

The present application relates to network security, and more specifically, to methods, systems and computer program products for secure authentication within a communication protocol session, for example, a TLS (Transport Layer Security) session.

With the increasing reliance on technology, it is becoming more and more important to secure online data and information as many network security threats today are spread through the Internet. Therefore, several technologies have been developed in order to secure transmission of data between servers and clients over a computer network.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment of the present invention, there is provided a computer implemented method for secure authentication within a communication protocol, for example, a Transport Layer Security (TLS) session. A challenge string associated with the TLS session can be retrieved by a client of the TLS session. A first digest can be then generated based on the retrieved challenge string and the client's authentication information. The first digest can be further sent from the client to a server of the TLS session. The retrieving, generating and sending are carried out after the TLS session has been established between the client and the server.

In another illustrative embodiment of the present invention, there is provided a computer implemented method for secure authentication with a Transport Layer Security (TLS) session. Authentication information of a client of the TLS session can be retrieved by a server of the TLS session. Then a first digest can be generated based on the retrieved authentication information and a challenge string associated with the TLS session. The first digest can be further compared with a second digest received from a client of the TLS session, wherein the second digest can be generated by the client based on the client's authentication information and the challenge string.

Further, computer program products and systems are also provided according to embodiments of the present invention.

These and other features and advantages of the present invention will be described in, or will become apparent to those of ordinary skill in the art in view of, the following detailed description of the example embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

As aforementioned, it becomes more and more important to secure communication (e.g. transmission of data between servers and clients) over a computer network due to an array of threats. Consequently, several communication protocols have been developed, among which Transport Layer Security (TLS) is an example of such a communication protocol, primarily used to provide privacy and data integrity between two communicating parties. In various embodiments of the present invention, TLS will be utilized as the implemented communication protocol. However, this is not meant to limit the scope of the present invention to use with TLS only. One of ordinary skill in the art will understand that other communication protocols may be used with the present invention. When secured by TLS, connections between a client (e.g. a web browser) and a server are typically believed to be secure. TLS is designed such that authentication information, used to identify a client, exchanged between the client and the server is merely encrypted with a determined secret key after a TLS session has been established. This mechanism may be exposed to man-in-the-middle (MITM) attacks. Embodiments of the present invention are targeting the problem of potential MITM attacks.

Embodiments of the invention can be deployed on cloud computer systems which will be described in the following. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
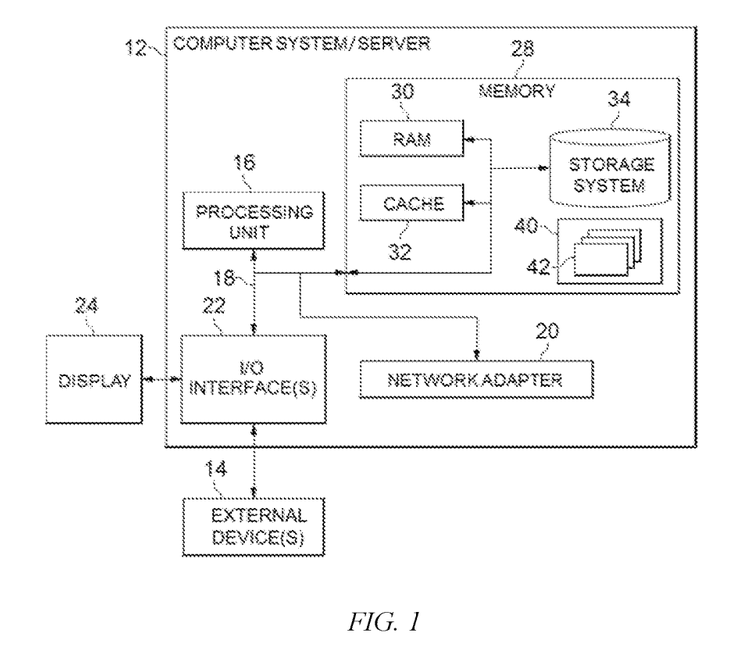
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
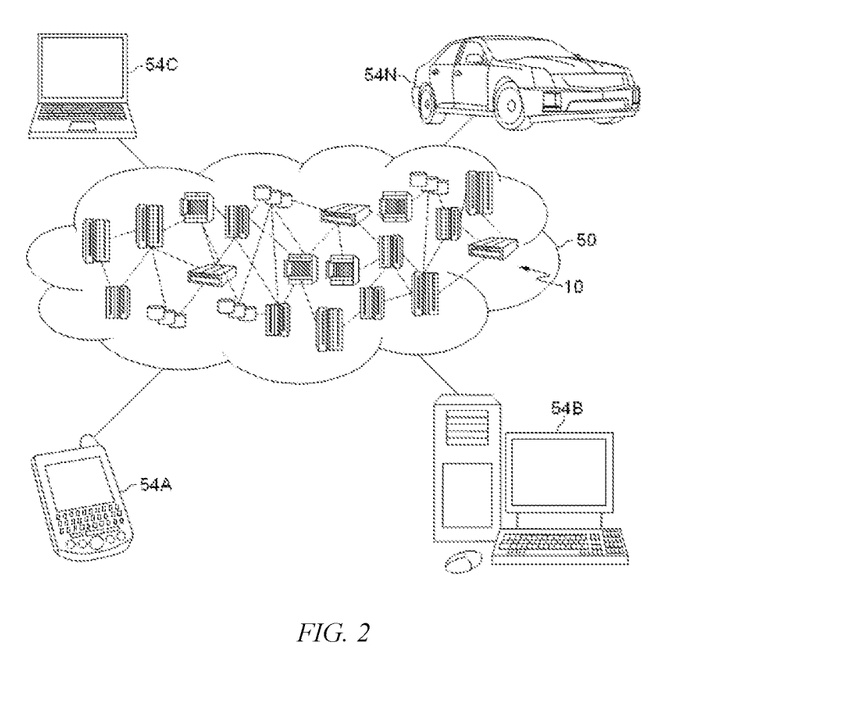
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that cloud computing nodes 10 and cloud computing environment 50 can communicate with any type of computerized device over any type of network and/or network addressable connection (e.g., using a web browser).

Figure 3:
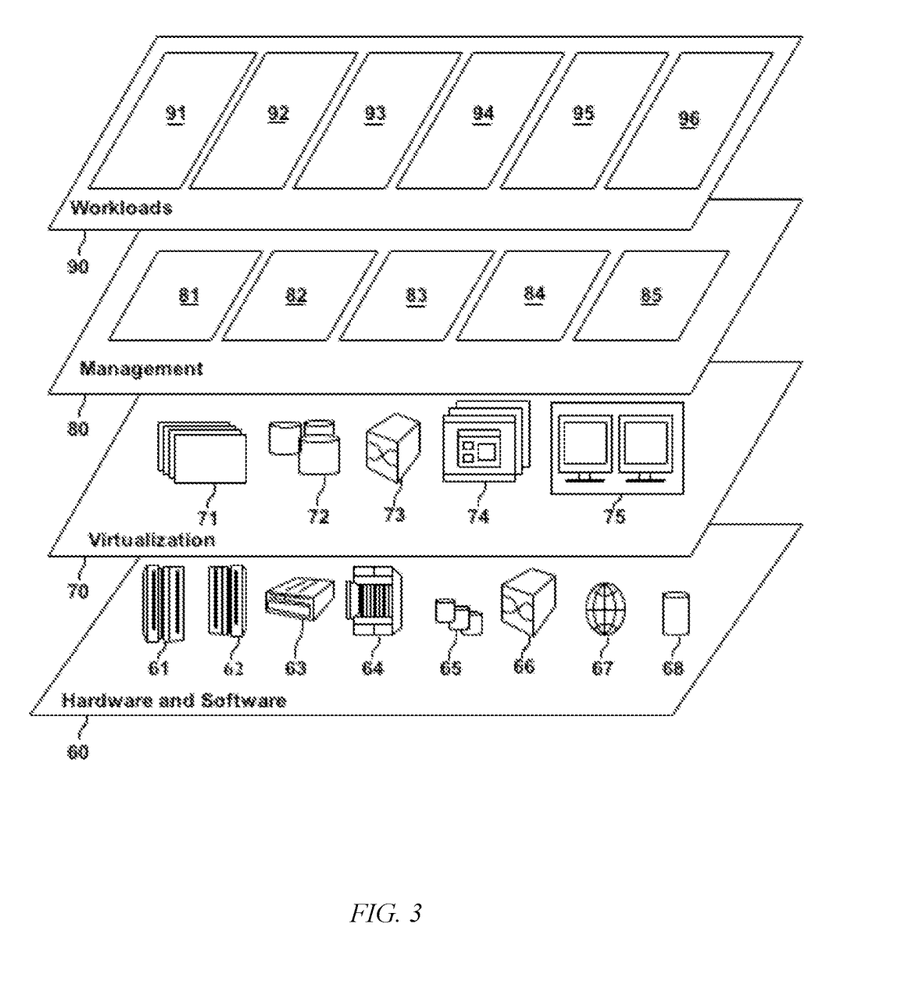
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure authentication 96 according to embodiments of the invention.

Embodiments of the invention will now be discussed in more details in the following with reference to FIG. 4 to FIG. 5.

TLS is a set of cryptographic protocols widely used in applications such as web browsing email, Internet faxing, instant messaging, and voice over IP (VoIP) etc., to provide communication security over a computer network. The TLS protocol comprises two layers, the TLS record and the TLS handshake protocols. Once a client and a server have agreed to use TLS, they negotiate a stateful connection by using a handshaking procedure. The TLS handshake enables the client and the server to establish the secret key(s) with which they communicate. After a TLS session has been established, the connection will be deemed as secure. Hence, authentication information exchanged between the client and the server is typically merely encrypted with the secret key(s). However, simple encryption of the authentication information will not definitely lead to its secure transmission in the presence of a man-in-the-middle (MITM) attack, as an MITM attacker can easily obtain the encrypted authentication information and use it for future authentication thus bypassing the security protection measures of TLS.

Figure 4:
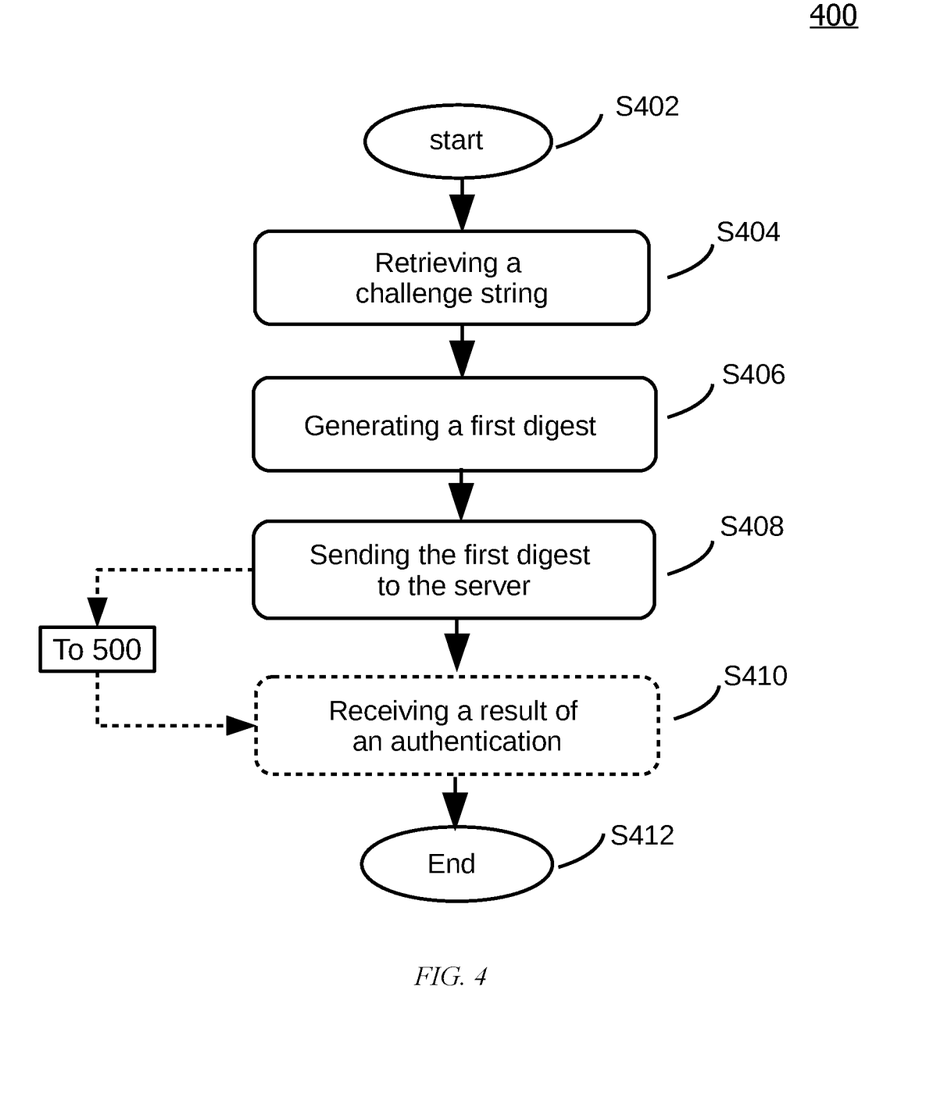
FIG. 4 illustrates a flowchart of an exemplary method 400 according to an embodiment of the present invention.
Figure 5:
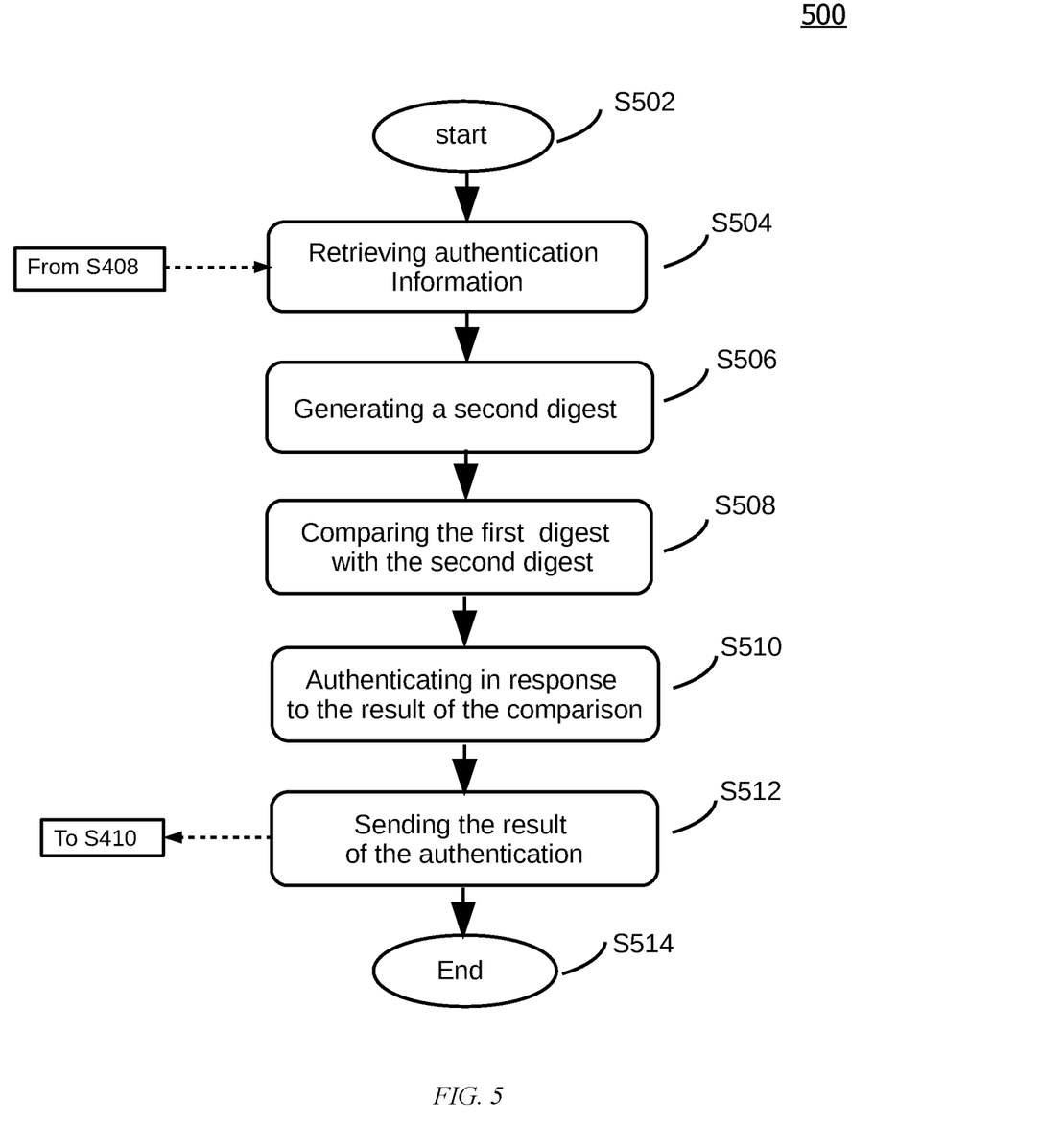
FIG. 5 shows a flowchart of an exemplary method 500 according to an embodiment of the present invention.

Considering the above-mentioned defect, embodiments of the present invention were developed with one shown in FIG. 4, which illustrates a flowchart of an exemplary method 400 according to an embodiment of the present invention.

The method 400, according to an embodiment of the present invention, can begin at step S402 after a TLS session has been established between a client and a server, and a user of the client has started to request access to server resources by providing the user's authentication information. Server resources mentioned here maybe computing resources, e.g. CPUs, memories, registers, as well as operating systems, virtual machines, databases etc. In order to authenticate the user, the method 400 then can proceed to step S404 in which a challenge string, which is associated with the TLS session, can be retrieved by the client of the TLS session. According to an embodiment of the present invention, the challenge string can be selected with the following criteria: i) it is unique; and ii) it changes to a new value in a next authentication.

According to an embodiment of the present invention, the challenge string can be associated with at least one of the following: i) a current TLS session record; or ii) a previous TLS session record.

A TLS session record typically consists of multiple bits segmented into several fields that identify for example a TLS Record Layer Protocol Type, a major and minor version of TLS, the length of a protocol message(s), MAC and Padding and etc. The format of a TLS session record is well defined in the TLS specifications and won't be discussed in detail in the specification. Typically, a TLS session record is unique to the TLS session and only known by the two communicating parties, thus an MITM attacker will not be able to retrieve it. According to an embodiment of the present invention, at least part of a TLS session record could be used as the challenge string. Both previous TLS session records and the current TLS session record are saved by the two communicating parties according to the TLS protocol. According to an embodiment of the invention, when a certain TLS record is selected to generate a challenge string, the TLS session record selected is communicated from the client to the server so that both communicating parties will know with which TLS session record the challenge string is generated. Alternatively, the challenge string per session is synchronized between the client and the server. Similarly, a derived key of a TLS session according to, for example, the IETF RFC 5705 "Keying Material Exporters for Transport Layer Security (TLS)" is also unique to the TLS session and only known by the communicating parties. While other existing algorithms or standards could also be utilized to generate a derived key of the TLS session (as long as the derived key of the TLS session is unique and only known by the communicating parties), they will not be discussed for the purpose of simplified illustration. The above mentioned derived key of a TLS session could be generated for example according to 'Exporter Definition' described in Chapter 4 of the IETF RFC 5705. In Chapter 4, a process is described which measures the exported key (i.e., the derived key of the TLS session discussed here) associated with the TLS session, a disambiguating label string that indicates that the authentication module of the client computer 602 (shown in FIG. 6) will use the exported keys, and a context value provided by the authentication module is generated. For more details, please refer to: https://tools.ietf.org/html/rfc5705. Further, when a TLS session changes, its TLS session record usually changes, as well as its derived key. The above-mentioned examples clearly satisfy the criteria specified above. However, it should be pointed out that examples listed above are merely for illustration purpose, it should be clear to a person skilled in the art that the challenge string may also be associated to any other suitable information so long as it satisfies the above-mentioned criteria.

In response to the retrieval of the challenge string, the method 400 according to an embodiment of the present invention can proceed to step S406, in which a first digest can be generated based on the retrieved challenge string and the authentication information provided by the user. According to an embodiment of the present invention, the authentication information may include at least password. The first digest may be the output generated by applying a hash function on a combination of inputs (i.e. the retrieved challenge string and the authentication information). According to an embodiment of the present invention, the authentication information may further include, in addition to a password, other related information including but not limited to cell number, address, email, etc., which together can help to authenticate the user. According to an embodiment of the present invention, the first digest may also be generated by applying the hash function based on the retrieved challenge string, the password, and any other selected related information. A combination of the challenge string and the authentication information can be used as a whole as the input of the hash function to generate the first digest. Also, although here it is described that a 'hash function' is utilized, the hash function may be any other suitable algorithm so long as a unique digest could be generated with it.

The method 400 then can proceed to step S408 in which the generated first digest can be sent to the server of the TLS session. According to an embodiment of the present invention, as the first digest instead of the password is sent to the server, and the challenge string retrieved is only known to the communicating parties, it would be impossible for an MITM attacker to get the actual password. Even in a worst-case scenario where the man-in-the-middle attacker has obtained the first digest and tries to authenticate with the server, it would be impossible as the challenge string has changed in the next authentication. Therefore, a new digest, generated based on the new challenge string and the authentication information, will be different from the first digest the man-in-the-middle attacker obtained, thus resulting in a failed authentication. By utilizing a digest generated based on a unique challenge string and the authentication information, the potential risk exposed to an MITM attacker can be mitigated.

Further, optionally, the method 400 according to an embodiment of the invention may then proceed to step S410 in which a result of an authentication can be received by the client of the TLS session from the server of the TLS session with the result being either a success or a failure of the authentication. Then the method 400 ends at step S412.

In the above, embodiments of the present invention have been discussed in detail with reference to FIG. 4 which generally describes the steps employed by a client of the TLS session. In the following, embodiments of the present invention will be further discussed in detail with reference to FIG. 5, which shows a flowchart of an exemplary method 500 according to an embodiment of the present invention which describes the steps employed by a server of the TLS session.

The method 500 may be carried out for example in response to step S408 shown in FIG. 4, in which the first digest can be sent to the server of the TLS session for authentication. The method 500 starts in step S502. Then, in step S504, authentication information of a user of a client of the TLS session can be retrieved by the server of the TLS session. The authentication information can be retrieved from any places, such as data structures, data schemas, data storages etc. that store the authentication information, or from remote storage via network, etc. The authentication information retrieved can be information that corresponds to the user's authentication information with which the server could authenticate the user. The authentication information retrieved could be pre-saved by the server during a registration process or retrieved from a trusted third party. After the authentication information has been retrieved by the server in step S504, a second digest can be generated based on the retrieved authentication information and a challenge string. A combination of the challenge string and the authentication information can be used as a whole as the input of a hash function to generate the second digest. According to an embodiment of the present invention, the second digest can be generated by applying the same hash function (as the client used to generate the first digest) based on the same challenge string retrieved by the client of the TLS session and the password. According to an embodiment of the present invention, the retrieved authentication information could further include other related information including but not limited to cell number, address, email, etc., which together can help to authenticate the user. According to an embodiment of the present invention, the second digest may also be generated by applying the same hash function on a combination of the retrieved challenge string, the password, and any other selected related information.

According to an embodiment of the present invention, the challenge string used could be synchronized between the client and the server utilizing any existing approaches known to a person skilled in the art, for example, a challenge string table stored with both parties. Each time when a challenge string is selected, the client can send its index in the table to the server. The server then can use the index to locate the selected challenge string. Or, according to another embodiment of the present invention, the challenge string could be simply sent from the client to the server. It should be noted to those skilled in the art that any other existing approaches could also be adopted to synchronize the challenge string between the client and the server. Also, although here it is described that a 'hash function' is utilized, the hash function may be any other suitable algorithm so long as a unique digest could be generated with it.

After the second digest has been generated in step S506, the method further proceeds to step S508 in which the first digest received from the client can be compared with the second digest, and in step S510, the user of the client can be authenticated or not in response to the result of the comparison, in which if the comparison shows a match, the authentication of the user will be a success, otherwise a failure. Then the result of the authentication can be sent to the client in step S512, which for example connects to the step S410 in FIG. 4. The requested server resources will be assigned or transferred to the user for use after the user is successfully authenticated. Otherwise, the user is rejected if the authentication with the server fails. The method 500 then ends at step S514.

In a situation where there is a MITM attacker who's secretly lurking between the client and the server of a TLS session, the information exchanged between them becomes totally visible to the MITM attacker. In traditional approaches where the user's authentication information transferred is encrypted using the methods determined during the TLS handshake phase, the MITM attacker can easily obtain the user's encrypted authentication information with which the attacker could easily authenticate with the server of the TLS session as the authentication information might be still valid. For example, if a TLS session is interrupted and then later resumed, the secret key determined during the handshake procedure can be reused. If a MITM attacker has obtained the encrypted authentication information of the user, it can use it to pretend to be the user of the client. The server of the TLS session would have no idea from whom the authentication information was sent. However, with the embodiments of the present invention presented here, because not the authentication information per se (either original or encrypted) is transferred but a digest generated based on the authentication information and a challenge string, which is unique and will change in a next authentication, is transferred from the client to the server, even if the MITM attacker has obtained the digest and sends it to the server for authentication, it will result in a failure as the challenge string has changed to a new value and thus the corresponding digest will change accordingly. The digest generated by the server with the changed challenge string will not match with the previous digest generated with the old challenge string. Therefore, the exposure to an MITM attack of a TLS session can be mitigated.

Figure 6:
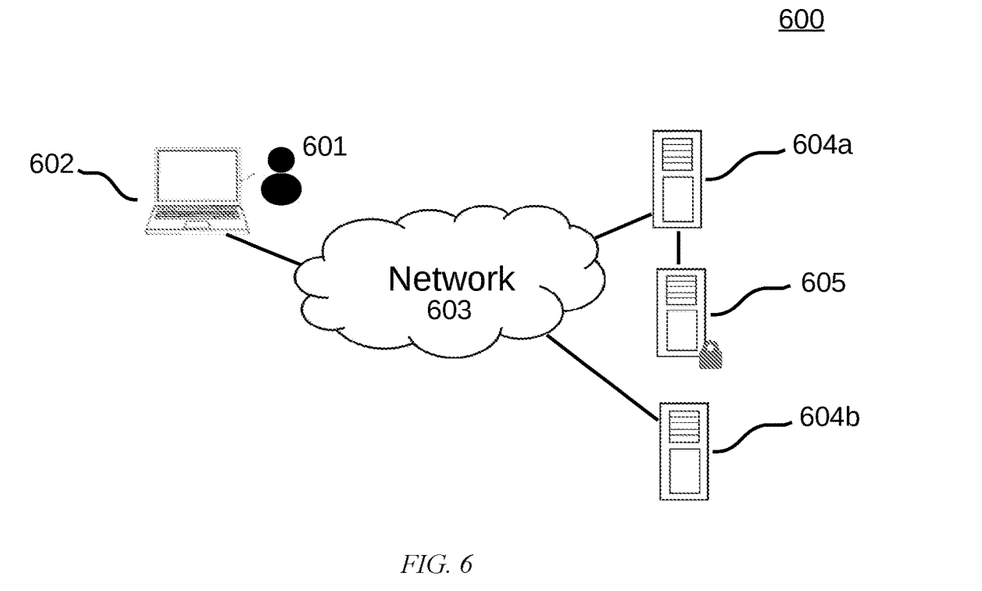
FIG. 6 shows a block diagram of an illustrative system 600 in which embodiments of the present invention may be implemented.

In the following, an illustrative system diagram in which embodiments of the present invention may be implemented is described with reference to FIG. 6. As shown in FIG. 6, a user 601 of a client 602 may be connected via a network 603 to one or more servers 604a, 604b. Servers 604a, 604b may be any types of servers including but not limited to world wide web (WWW) server, file server, database server, image server etc. A dedicated authentication server 605 that is responsible for the authentication of the user with authentication information provided is connected to the server 604a. Although the dedicated authentication server 605 is shown in FIG. 6 as directly connected to the server 604a, it can also be connected via the network 603. Also, the functionalities of the dedicated authentication server 605 may be incorporated with server 604a as an authentication module (not illustrated). There are three servers shown in FIG. 6, fewer or more servers may exist. The client 602, the servers 604a, 604b, 605 may include internal and external hardware components as depicted in detail with reference to FIG. 1. In other embodiments, the client 601, the servers 604a, 604b, 605 may represent a cloud computing environment as described in relation to FIG. 2.

According to embodiments of the present invention, a user wishes to access server resources associated with the user on the server 604a by first establishing a TLS session between the client 602 and the server 604a. After a TLS session has been successfully established between the client 602 and the server 604a, the user 601 sends a request to the server 604a via the client 602 to access server resources associated with the user by providing the user's authentication information. The client 602 (or an authentication module (not shown) in the client 602) retrieves a challenge string described in the above and then generates a first digest based on the retrieved challenge string and the authentication information provided by the user 601, also as described above. Server resources mentioned here maybe computing resources, e.g. CPUs, memories, registers, as well as operating systems, virtual machines, databases etc. Then client 602 (or the authentication module of the client 602) sends the first digest to the server 604a for authentication. Upon receiving the first digest from the client 602, the authentication module (not shown) of the server 604a or the dedicated authentication server 605 retrieves authentication information of the user 601, pre-saved or from a third party, and generates a second digest with the authentication information and the challenge string the client used to generate the first digest. The challenge string may be retrieved by the authentication module (not shown) in the server 604a or may be retrieved by the server 604a and sent to the dedicated authentication server 605 if the dedicated authentication server 605 is in place. The dedicated authentication server 605 (or an authentication module within the server 604a) then authenticates the user 601 by comparing the first digest with the second digest. If the two digests match each other, the requested server resources will be assigned or transferred to the user 601 for use in following data transmissions. If the two digests do not match each other, the user 601 is rejected from accessing server resources.

Figure 7:
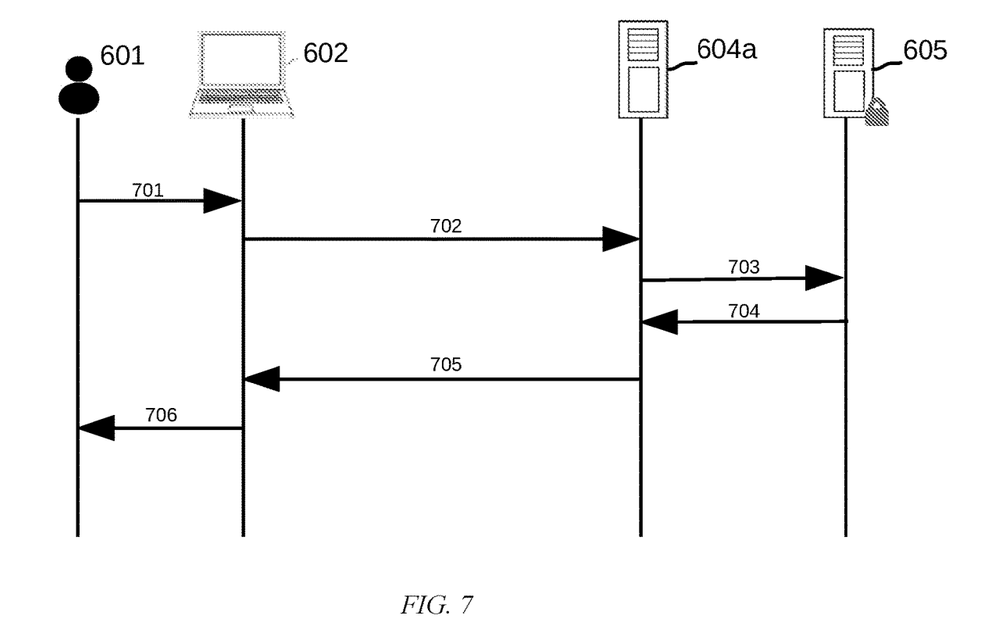
FIG. 7 depicts an exemplary signal flow diagram according to an embodiment of the present invention.

Now referring to FIG. 7, which depicts an exemplary signal flow diagram according to an embodiment of the present invention. As shown in FIG. 7, a user wishes to access server resources on the server 604a by first establishing a TLS session between the client 602 and the server 604a. After a TLS session has been successfully established between the client 602 and the server 604a, the user 601 sends a request 701 to the server 604a to access server resources associated with the user via the client 602 by providing the user's authentication information. Server resources mentioned here maybe computing resources, e.g. CPUs, memories, registers, as well as operating systems, virtual machines, databases etc. In response to the reception of authentication information, the client 602 (or an authentication module (not shown) in the client 602) retrieves a challenge string described in the above and generates a first digest using the retrieved challenge string and the authentication information provided by the user 601, also as described above. The client 602 (or the authentication module of the client 602) then sends an authentication request 702 with the generated first digest to the server 604a, requesting the server 604a to authenticate the user 601. The server 604a receives the request 702, forwards 703 it to a dedicated authentication server 605 (or an authentication module (not shown) within the server 604a) which retrieves the authentication information of the user 601, pre-saved or from a third party, and generates a second digest with the authentication information and the challenge string the client used to generate the first digest. The challenge string may be retrieved by an authentication module (not shown) in the server 604a or may be retrieved by the server 604a and sent to the dedicated authentication server 605 if the dedicated authentication server 605 is in place. The dedicated authentication server 605 (or an authentication module within the server 604a) then authenticates the user 601 by comparing the first digest with the second digest and returns 704 the result of the authentication to the server 604a. The result of the authentication is further returned 705 to the client 602 which returns 706 to the user 601. If the two digests match each other, the authentication is successful and the requested server resources will be assigned or transferred to the user 601 for use in following data transmissions. If the two digests do not match each other, the user 601 is rejected from accessing server resources.

Compared with old methods, for example, utilization of RSA key fobs which requires two key fobs and a pseudo-random number generator executing on the server and user intervention, embodiments of the present invention provide enhanced protection of authentication process of a user after a TLS session has been established. The enhanced protection is also transparent to the user and does not require user intervention during the process. Because the information being used already exists as part of the normal operation, embodiments of the present invention do not need extra computing resources.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for secure authentication within a communication protocol session, comprising:
   in response to receiving authentication information of a user of a client computer of a transport layer security (TLS) session, retrieving, by the client computer, a challenge string associated with the TLS session, wherein the challenge string is based, at least, on a selected TLS session record;
   communicating, by the client computer, the selected TLS session to a server of the TLS session;
   generating, by the client computer, a first digest based on the challenge string and the authentication information; and
   sending, by the client computer, the first digest to the server of the TLS session, wherein the retrieving, communicating, generating, and sending, by the client computer, are carried out after the TLS session has been established between the client computer and the server.

2. The computer implemented method of claim 1, wherein the challenge string is synchronized between the client computer and the server, and wherein the challenge string is different in subsequent authentications.

3. The computer implemented method of claim 1, wherein the first digest is generated by applying a hash function on a combination of the challenge string and the authentication information.

4. The computer implemented method of claim 1, wherein the selected TLS session record comprises at least one of a current TLS session record or a previous TLS session record.

5. The computer implemented method of claim 1, wherein the authentication information includes a password.

6. The computer implemented method of claim 1, further comprising:
   receiving, from the server of the TLS session, a result of an authentication.

7. The computer implemented method of claim 1, further comprising:
   retrieving, by the server, the authentication information of the user;
   generating, by the server, a second digest based on the retrieved authentication information and the challenge string associated with the TLS session;

comparing, by the server, the second digest with the first digest received from the client computer;

authenticating, by the server, the user in response to a result of the comparison, wherein the retrieving, generating, comparing and authenticating, by the server, are carried out after the TLS session has been established between the client and the server.

8. The computer implemented method of claim 7, wherein the first digest and the second digest are generated respectively by applying a same hash function on a combination of the challenge string and the authentication information.

9. A computer program product for secure authentication within a Transport Layer Security (TLS) session, the computer program product comprising:

one or more computer-readable tangible storage devices and program instructions stored on at least one of the one or more computer-readable tangible storage devices, the program instructions comprising:

program instructions to retrieve authentication information of a user from a client of the TLS session;

in response to retrieving the authentication information from the client, program instructions to retrieve a challenge string associated with the TLS session, wherein the challenge string is based, at least, on a selected TLS session record;

program instructions to communicate, by the client, the selected TLS session record;

program instructions to generate a first digest based on the retrieved authentication information and the challenge string;

program instructions to compare the first digest with a second digest received from the client of the TLS session, wherein the second digest is generated by the client of the TLS session based on the authentication information and the challenge string; and program instructions to authenticate the user in response to a result of the comparison, wherein the retrieving, communicating, generating, comparing and authenticating are carried out after the TLS session has been established between the client of the TLS session and a server of the TLS session.

10. The computer program product of claim 9, wherein the challenge string is synchronized between the client of the TLS session and the server of the TLS session, and wherein the challenge string is different in subsequent authentications.

11. The computer program product of claim 9, wherein the first digest and the second digest are generated respectively by applying a same hash function on a combination of the challenge string and the authentication information.

12. The computer program product of claim 9, wherein the selected TLS session record comprises at least one of a current TLS session record or a previous TLS session record.

13. The computer program product of claim 9, wherein the authentication information includes a password.

14. The computer program product of claim 9, further comprising:

program instructions to receive, by the client of the TLS session, the result of the comparison.

15. A computer system for secure authentication within a Transport Layer Security (TLS) session, the computer system comprising:

one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:

program instructions to retrieve authentication information of a user from a client of the TLS session;

in response to retrieving the authentication information from the client, program instructions to retrieve a challenge string associated with the TLS session, wherein the challenge string is based, at least, on a selected TLS session record;

program instructions to communicate, by the client, the selected TLS session record;

program instructions to generate a first digest based on the retrieved authentication information and the challenge string;

program instructions to compare the first digest with a second digest received from the client of the TLS session, wherein the second digest is generated by the client of the TLS session based on the authentication information and the challenge string; and program instructions to authenticate the user in response to a result of the comparison, wherein the retrieving, communicating, generating, comparing and authenticating are carried out after the TLS session has been established between the client of the TLS session and a server of the TLS session.

16. The computer system of claim 15, wherein the challenge string is synchronized between the client of the TLS session and the server of the TLS session, and wherein the challenge string is different in subsequent authentications.

17. The computer system of claim 15, wherein the selected TLS session record comprises at least one of a current TLS session record or a previous TLS session record.

18. The computer system of claim 15, wherein the first digest and the second digest are generated respectively by applying a same hash function on a combination of the challenge string and the authentication information.

19. The computer system of claim 15, wherein the authentication information includes a password.

20. The computer system of claim 15, further comprising:

program instructions to receive, by the client of the TLS session, the result of the comparison.

* * * * *